United States Patent
Vlasenkov

(10) Patent No.: US 12,462,405 B2
(45) Date of Patent: Nov. 4, 2025

(54) AUTOMATIC 3D MEDICAL IMAGE ORIENTATION DETERMINATION

(71) Applicant: KONINKLIJKE PHILIPS N.V., Eindhoven (NL)

(72) Inventor: Leonid Vlasenkov, Moscow (RU)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 432 days.

(21) Appl. No.: 17/920,056

(22) PCT Filed: Apr. 21, 2021

(86) PCT No.: PCT/EP2021/060285
§ 371 (c)(1),
(2) Date: Oct. 20, 2022

(87) PCT Pub. No.: WO2021/214089
PCT Pub. Date: Oct. 28, 2021

(65) Prior Publication Data
US 2023/0169667 A1   Jun. 1, 2023

(30) Foreign Application Priority Data
Apr. 21, 2020 (RU) .......................... RU2020114316

(51) Int. Cl.
*G06T 7/32* (2017.01)
*G06T 7/11* (2017.01)
*G06T 7/33* (2017.01)

(52) U.S. Cl.
CPC .................. *G06T 7/32* (2017.01); *G06T 7/11* (2017.01); *G06T 7/337* (2017.01);
(Continued)

(58) Field of Classification Search
CPC ... G06T 7/32; G06T 7/11; G06T 7/337; G06T 2207/10072; G06T 2207/20021;
(Continued)

(56) References Cited

U.S. PATENT DOCUMENTS 5,734,739 A * 3/1998 Sheehan ................... G06T 7/12
600/407
6,106,463 A * 8/2000 Wilk ...................... G16H 40/67
600/437
(Continued)

FOREIGN PATENT DOCUMENTS

CN       116993793 A * 11/2023 ............... G06T 7/33
EP         3392832 A1 * 10/2018 ........... G06K 9/2054
(Continued)

OTHER PUBLICATIONS

Fan; Yuzhou et al., "Extracting Cross-Sectional Clinical Images Based on Their Principal Axes of Inertia", Dec. 19, 2017, Hindawi Wiley vol. 2017 (Year: 2017).*
(Continued)

*Primary Examiner* — Aaron W Carter
*Assistant Examiner* — Alejandro Hernandez

(57) ABSTRACT

A system, method and non-transitory computer readable storage medium for aligning a set of medical images. The operations for aligning the medical images include receiving a set of medical images, selecting anchor organs from the medical images, training a segmentation model to identify the anchor organs in the medical images based on a training dataset and generating, based on the segmentation model, a segmentation mask for the anchor organs. The operations also include computing image coordinates for the anchor organs in each of the medical images based on a center of mass of each of the anchor organs, determining a correlation between the image coordinates for the anchor organs in each of the medical images and corresponding anatomical coor-
(Continued)

dinates for the anchor organs in the training dataset and aligning each of the set of medical images based on the correlation between the image coordinates and the anatomical coordinates.

14 Claims, 6 Drawing Sheets

(52) U.S. Cl.
CPC ............... *G06T 2207/10072* (2013.01); *G06T 2207/20021* (2013.01); *G06T 2207/20081* (2013.01); *G06T 2207/30004* (2013.01); *G06T 2207/30196* (2013.01)

(58) Field of Classification Search
CPC . G06T 2207/20081; G06T 2207/30004; G06T 2207/30196; G06T 7/0012; G06T 7/0014; G06T 7/10; G06T 7/149; G06T 7/35; G06T 7/0002; G06V 15/00; A61B 6/5211; A61B 6/5223; A61B 5/0033; A61B 5/004; A61B 34/10; G16H 30/40; G16H 30/20; G06V 10/70; G06V 10/764
See application file for complete search history.

(56) References Cited

U.S. PATENT DOCUMENTS

| | | | |
|---|---|---|---|
| 8,160,322 B2 | 4/2012 | Dikmen | |
| 9,129,365 B2 | 9/2015 | Duhamel | |
| 11,944,481 B1* | 4/2024 | Douglas | A61N 5/103 |
| 2007/0055142 A1* | 3/2007 | Webler | A61B 5/704 |
| | | | 600/425 |
| 2008/0260219 A1 | 10/2008 | Witte | |
| 2010/0128946 A1* | 5/2010 | Fidrich | G06T 7/149 |
| | | | 382/131 |
| 2010/0128953 A1 | 5/2010 | Ostrovsky-Berman et al. | |
| 2011/0229056 A1* | 9/2011 | Robertson | G06T 7/248 |
| | | | 382/294 |
| 2013/0034203 A1* | 2/2013 | Wang | A61B 6/5247 |
| | | | 378/62 |
| 2013/0079636 A1* | 3/2013 | Hashimoto | A61B 8/4416 |
| | | | 600/440 |
| 2013/0322715 A1* | 12/2013 | Wollenweber | A61B 6/037 |
| | | | 382/131 |
| 2015/0025316 A1* | 1/2015 | Hasegawa | A61B 1/04 |
| | | | 600/109 |
| 2015/0227679 A1* | 8/2015 | Kamer | A61B 34/10 |
| | | | 703/11 |
| 2016/0300343 A1 | 10/2016 | Gazit | |
| 2017/0200067 A1* | 7/2017 | Zhou | G06V 30/194 |
| 2018/0060652 A1 | 3/2018 | Zhang | |
| 2018/0263698 A1* | 9/2018 | Wang | G06T 7/33 |
| 2019/0066294 A1* | 2/2019 | Yu | G06T 7/143 |
| 2019/0251694 A1 | 8/2019 | Han et al. | |
| 2020/0357098 A1* | 11/2020 | Yoo | G16H 50/20 |
| 2021/0225000 A1* | 7/2021 | Guo | G06T 7/11 |
| 2021/0249142 A1* | 8/2021 | Lau | G16H 50/50 |
| 2022/0005586 A1* | 1/2022 | Brynolfsson | G06T 7/0012 |
| 2022/0012882 A1* | 1/2022 | Labiche | G16H 20/40 |
| 2022/0207743 A1* | 6/2022 | Toporek | G06T 7/70 |
| 2022/0296213 A1* | 9/2022 | Dufour | G06T 7/0014 |
| 2023/0100078 A1* | 3/2023 | Toporek | G06T 7/33 |
| | | | 382/131 |
| 2023/0277156 A1* | 9/2023 | Collins | G06T 7/187 |
| | | | 382/128 |
| 2023/0306590 A1* | 9/2023 | Jazdzyk | G16H 30/40 |
| 2024/0050172 A1* | 2/2024 | Wu | G06T 7/174 |
| 2025/0120736 A1* | 4/2025 | Aljuri | A61B 17/32037 |

FOREIGN PATENT DOCUMENTS

| | | | | |
|---|---|---|---|---|
| FR | 3139651 A1 * | 3/2024 | | G06T 7/344 |
| JP | 6026098 B2 * | 11/2016 | | G06T 7/38 |
| WO | 2018222755 A1 | 12/2018 | | |

OTHER PUBLICATIONS

Fang; Hao-Shu et al. "InstaBoost: Boosting Instance Segmentation via Probability Map Guided Copy-Pasting", 2019, ICCV 2019 (Year: 2019).*

Vladislav; Proskurov et al. "Fast Lung Localization in Computed Tomography by a 1D Detection Network", May 2021, IEEE (Year: 2021).*

International Search Report and Written Opinion Dated Jul. 26, 2021 for International Application No. PCT/EP2021/060285 Filed Apr. 21, 2021.

Ashish, et al: "Automated Mouse Organ Segmentation: A Deep Learning Based Solution", Apr. 234, 2018.

Chen, et al: "Spatial Characterization and Classification of Rectal Bleeding in Prostate Cancer Radiotherapy with a Voxel-Based Principal Components Analysis Model for 3D Dose Distribution", Sep. 22, 2011.

Donner, et al: "Global localization of 3D anatomical structures by pre-filtered Hough Forests and discrete optimization", Medical Image Analysis, vol. 17, Issue 8, Dec. 2013, pp. 1304-1314.

Potesil, et al: "Improved Anatomical Landmark Localization in Medical Images Using Dense Matching of Graphical Models", BMVC 2010.

* cited by examiner

AUTOMATIC 3D MEDICAL IMAGE ORIENTATION DETERMINATION

CROSS REFERENCE TO RELATED APPLICATIONS

This application is the U.S. National Phase application under 35 U.S.C. § 371 of International Application No. PCT/EP2021/060285 filed Apr. 21, 2021, which claims the benefit of Russian Patent Application Number 2020114316 filed Apr. 21, 2020. These applications are hereby incorporated by reference herein.

BACKGROUND OF THE INVENTION

There are multiple two-dimensional (2D) and three-dimensional (3D) medical imaging modalities. Examples include Computed Tomography (CT), Magnetic Resonance Imaging (MRI), Positron Emission Tomography (PET), and Ultrasound (US) scans that are used to depict different parts of the human body. These medical images may take on various forms once they are stored in a database. Researchers and clinical experts access the scans within these medical images to determine the orientation of different parts of the human body. However, the medical images are not always aligned due to, for instance patient movement during imaging. Also, various formats are used to store the medical images which do not always support the storage meta information related to the patient information, losing some orientation information during the processing stages. Determining the body orientation from the scans from the images alone becomes difficult. Additionally, clinical experts and researchers spend a lot of time rotating these medical images to conform to the desirable representation. Thus, there is a need for a fast and robust method that would allow clinical professionals to properly align the medical images and compute the transition from image coordinates to anatomical coordinates to normalize these images. Additionally, aligning the medical images would allow the clinical expert to automatically spot the desired body part.

Existing prior art is devoted to landmark localization. For example, US 20080260219A1 and U.S. Pat. No. 8,160,322 are existing approaches that describe landmark localization. However, these approaches present a number of disadvantages such as a requirement of feature engineering, dependence on modality or body part and its size, lack of invariance to affine transforms, computational inefficiency etc. Also, these approaches require data that is already annotated specifically with landmarks. Consequently, these approaches are not fully compatible with image segmentation datasets common in modern medical computer vision.

SUMMARY OF THE INVENTION

Some exemplary embodiments are directed to a method that includes receiving a set of medical images from a medical imager, selecting one or more anchor organs from the medical images, training a segmentation model to identify the selected one or more anchor organs in the set of medical images based on a training dataset received from a database and generating, based on the segmentation model, a segmentation mask for the selected one or more anchor organs. The method may further include computing image coordinates for the selected one or more anchor organs in each of the set of medical images based on a center of mass of each of the selected one or more anchor organs. The method may also include determining a correlation between the image coordinates for the selected one or more anchor organs in each of the set of medical images and corresponding anatomical coordinates for the selected one or more anchor organs in the training dataset and aligning each of the set of medical images based on the correlation between the image coordinates and the anatomical coordinates.

Other exemplary embodiments are directed to a system having a memory and a processor. The memory stores a set of medical images received from a medical imager and a training dataset. The processor is configured to select one or more anchor organs from the set of medical images, train a segmentation model to identify the selected one or more anchor organs in the set of medical images based on the training dataset and generate, based on the segmentation model, a segmentation mask for the selected one or more anchor organs. The processor may be further configured to compute image coordinates for the selected one or more anchor organs in each of the set of medical images based on a center of mass of each of the selected one or more anchor organs. The processor may be further configured to determine a correlation between the image coordinates for the selected one or more anchor organs in each of the set of medical images and corresponding anatomical coordinates for the selected one or more anchor organs in the training dataset and align each of the set of medical images based on the correlation between the image coordinates and the anatomical coordinates.

In still further exemplary embodiments, a non-transitory computer readable storage medium having a set of instructions executable by a processor is described. Executing the instructions causes the processor to receive a set of medical images from a medical imager, select one or more anchor organs from the medical images, train a segmentation model to identify the selected one or more anchor organs in the set of medical images based on a training dataset received from a database and generate, based on the segmentation model, a segmentation mask for the selected one or more anchor organs.

DETAILED DESCRIPTION OF EMBODIMENTS

Figure 1:
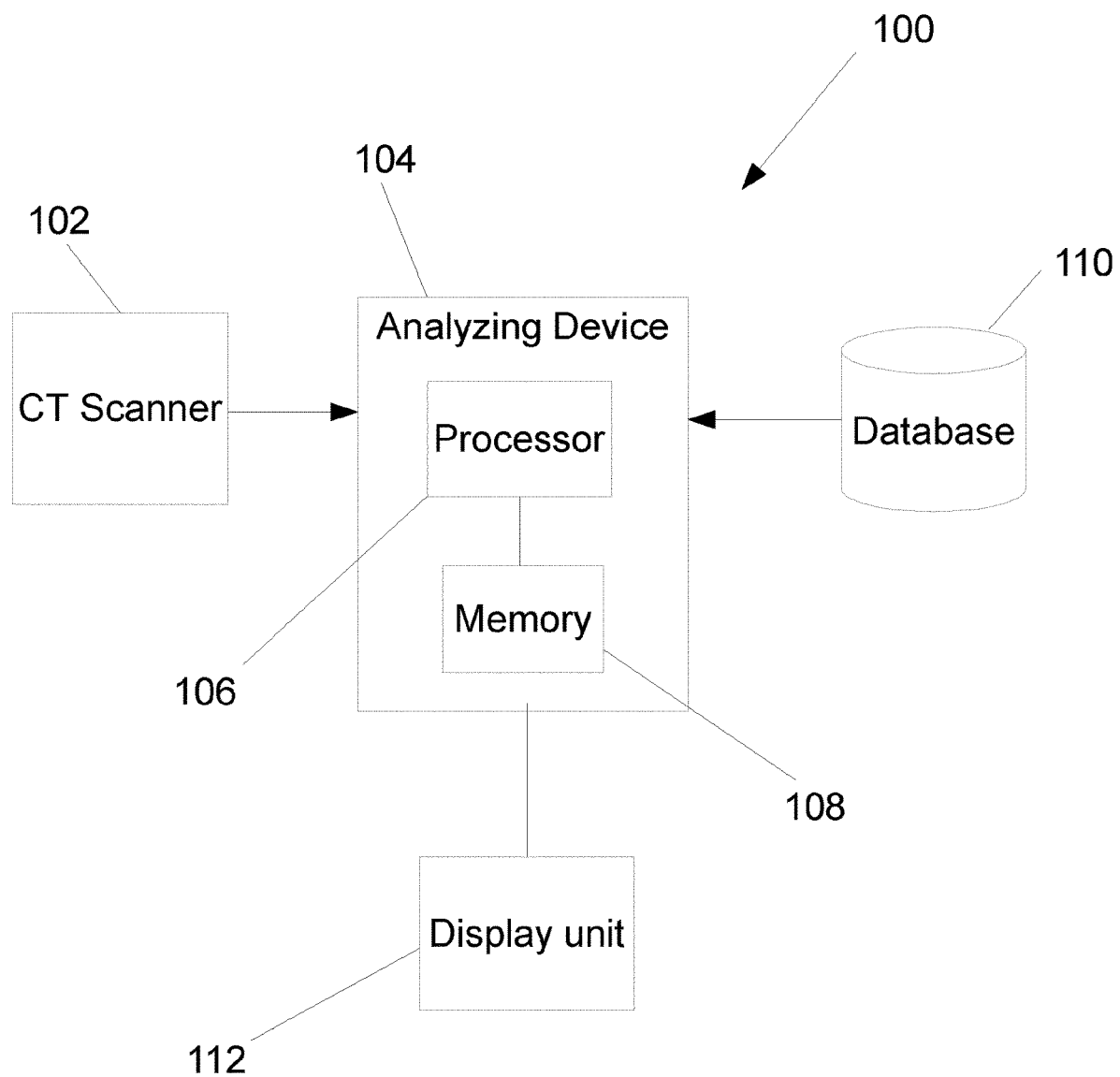
FIG. 1 shows a system for 3D medical image orientation determination according to various exemplary embodiments of the present disclosure.

The exemplary embodiments may be further understood with reference to the following description and the appended drawings, wherein like elements are referred to with the same reference numerals. The exemplary embodiments relate to a system and method for automatically identifying the body orientation in a 2D or 3D medical image and conforming the image to a standard or custom anatomical coordinate system. The exemplary embodiments provide a system and method for aligning a plurality of images obtained from an imaging device and conforming the aligned images to a standard or anatomical coordinate system.

In addition, the exemplary embodiments can be used to automatically spot a desired body part. For example, if a radiologist sorts to analyze an abdominal area, the aligned 2D or 3D images conformed to a certain coordinate system allows the radiologist to automatically shift the viewpoint to the desired area in the coordinate system.

The exemplary embodiments may be directed to 2D or 3D images. However, for the purpose of illustrations, the exemplary embodiments will be described with reference to 3D images. Furthermore, the exemplary embodiments are described with reference to a CT scanner for generating the 3D images. However, the use of a CT scanner is only exemplary and any known imaging devices such as MM device, PET device, etc. may be employed in the exemplary embodiments.

As shown in FIG. 1, a system 100 according to various exemplary embodiments of the present disclosure determines the body orientation in a 3D medical image and conforms the images to a standard or custom anatomical coordinate system. The system 100 includes a CT scanner 102 for generating the 3D scans. The CT scanner 102 images a part of a patient's body and generates a plurality of 3D scans of the part of the patient's body. The part of the patient's body that may be imaged includes chest area, abdomen, etc. Those skilled in the art will understand that these body parts are only exemplary and thus, other body parts may be imaged. The plurality of 3D scans obtained may have variations due to various factors during the imaging process, e.g., the subject's movements during the imaging.

The system 100 further includes an analyzing device 104. The analyzing device 104 includes a processor 106 for performing various analysis such as selecting anchor organs in the 3D scan, training a segmentation model to identify the anchor organs and aligning the 3D scans in a coordinate system of interest. Each of these operations will be described in greater detail below. The analyzing device 104 further includes a memory 108 for storing the 3D scans and a segmentation model. One of ordinary skill in the art will understand that the analyzing device 104 and the CT scanner 102 may be connected through a wired connection or a wireless connection.

The system 100 further includes a database 110 connected to the analyzing device 104 containing training datasets for training the segmentation model. The training datasets may be also used to generate target coordinates for aligning the 3D scans which will be described further below. The system 100 further includes a display unit 112 for displaying the aligned 3D scans in a coordinate system of interest.

The processor 106 in the analyzing device 104 receives the plurality of 3D scans from the CT scanner. The 3D scans may not be aligned due to, for example, patient movement during imaging. Thus, the processor 106 normalizes the 3D scans by first determining the orientation of the images using organ locations in each scan. The processor 102 may select one or more anchor organs in the 3D scan. The anchor organs that may be selected are not limited to organs of the body but may also include other body parts such as bones. Examples of anchor organs include, heart, liver, spinal cord, left lung, right lung, pelvis, stomach, etc. The anchor organs that are selected in the 3D scans may be based on the training datasets available in the database 110 and the set of organs that will be present in the 3D images during the final application.

Figure 3:
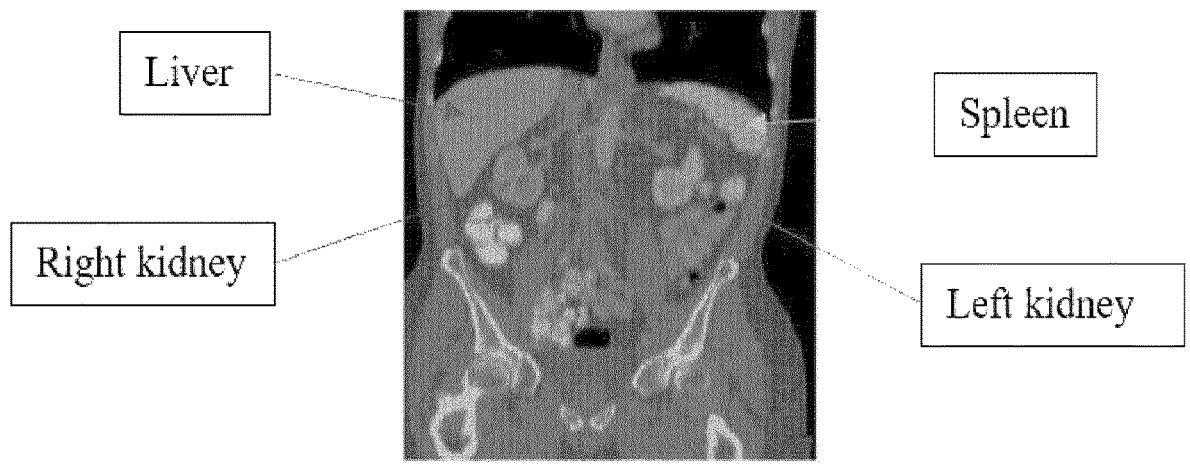
FIG. 3 shows an exemplary 3D image for selecting anchor organs according to various exemplary embodiments of the present disclosure.

In the example shown in FIG. 3, the processor 106 selects four anchor organs in the 3D scan, e.g., the liver, spleen, right kidney and left kidney, as the set of anchor organs in each 3D scan of the subject. However, it should be understood that the number of anchor organs may include less than four or more than four.

The processor 102 further trains a semantic segmentation model to identify the anchor organs selected in the 3D scan, which will be described in detail below. The analyzing device 104 applies the segmentation model to any new 3D scan of the subject to identify the anchor organs. The segmentation model is generated by any machine learning model for semantic segmentation and trained to consume the medical images obtained from the CT scanner 102. The segmentation model further outputs a segmentation mask indicating the positions of the selected anchor organs as shown in FIG. 4.

Figure 4:
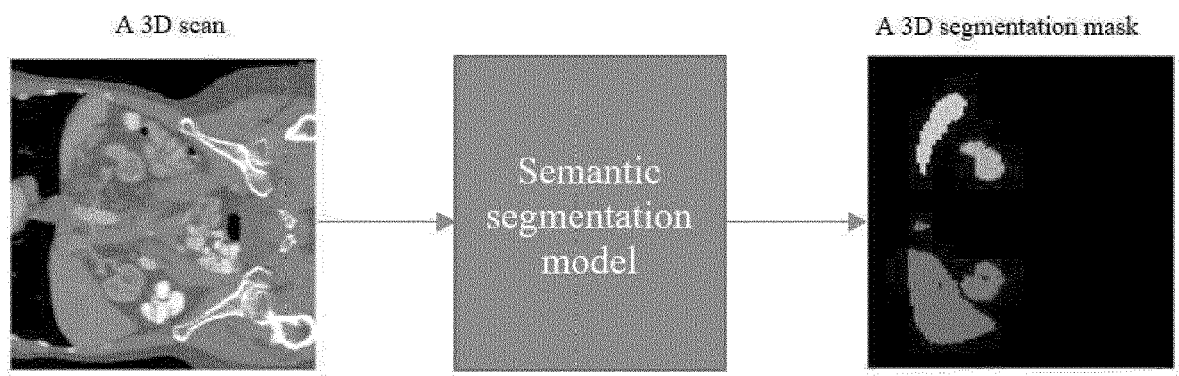
FIG. 4 shows an exemplary segmentation model for generating a segmentation mask from the 3D according to various exemplary embodiments of the present disclosure.

The segmentation model is trained to consume the entire volume of the 3D scan as illustrated in FIG. 4. Additionally, the segmentation model is trained to consume the 3D scan in low resolution. Training the segmentation model in low resolution advantageously makes inferences fast during final application and facilitates the use of deep neural networks for example, U-net. In a further exemplary embodiment, the segmentation model is trained to be scale and rotation invariant by augmenting the training data with random scaling (without aspect ratio preservation) and rotations. Alternatively, to make the segmentation model useful for different body parts, the segmentation model may be trained to generate another augmentation with random crops of various body parts of the 3D image.

The segmentation model is generated by training a machine learning algorithm of the machine learning model using the training dataset in the database 110. As shown in FIG. 3, the anchor organs are usually different in sizes. Thus, the training datasets in the database 110 can be trained using class balancing to identify the anchor organs with different sizes in the 3D scan. Also, the class balancing for the segmentation model may be performed on batch level due to aggressive augmentations. The memory 110 stores the segmentation model generated using the machine learning algorithm and applies the model to each 3D scan to generate the segmentation mask as indicated in FIG. 4. As illustrated in FIG. 4, the segmentation model consumes the 3D medical image with the liver, spleen, right kidney and left kidney selected as the anchor organs to produce a 3D segmentation mask. The segmentation mask labels each voxel as either background or as belonging to one of the selected anchor organs, as will be described further below.

Figure 5:
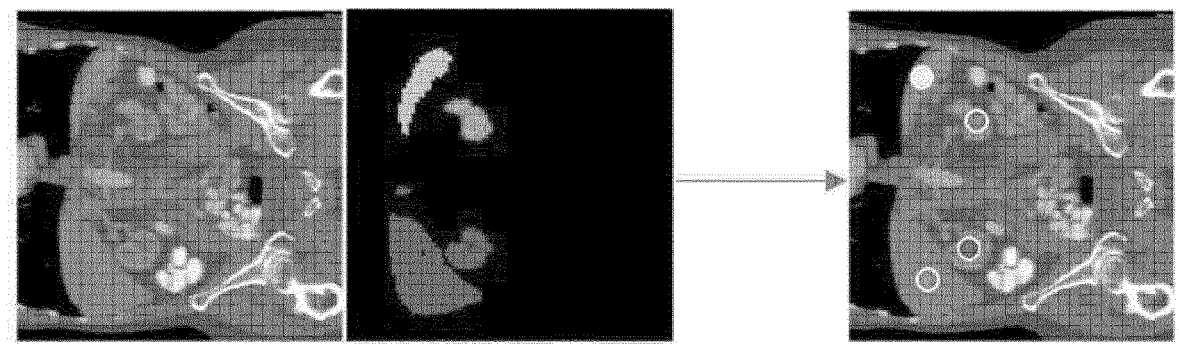
FIG. 5 shows an exemplary diagram for determining the organ centers according to various exemplary embodiments of the present disclosure.
Figure 6:
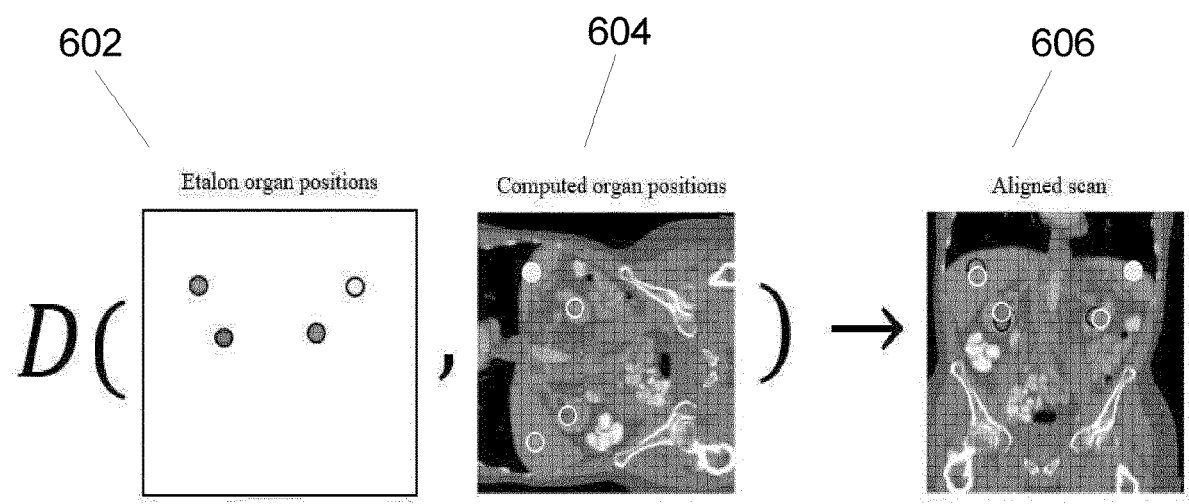
FIG. 6 shows an exemplary diagram aligning the medical images and conforming the image to a coordinate system of interest according to various exemplary embodiments of the present disclosure.

However, the scan that may be applied to the segmentation model to output the segmentation mask may have arbitrary orientations. The processor 106 may further compute the coordinates of the centers of the selected anchor organs using the segmentation mask to determine the alignment between the image coordinate system and the anatomical coordinate system of the anchor organs as indicated in FIG. 5 and FIG. 6, to be described further below. The display unit 112 is configured to display the aligned 3D scan. The various functions of the processor 106 may also be represented as a separate incorporated component or may be a modular component. The processor 106 and the memory 108 may be embedded in the analyzing device 104 as shown in FIG. 1 or serve as different components connected to the analyzing device 104. The analyzing device 104 may be connected to a display unit 112 via wired connection or wireless connection. In addition, the functionality described for the processor 102 may be split among two or more processors. The exemplary embodiments may be implemented in any of these or other configurations.

Figure 2:
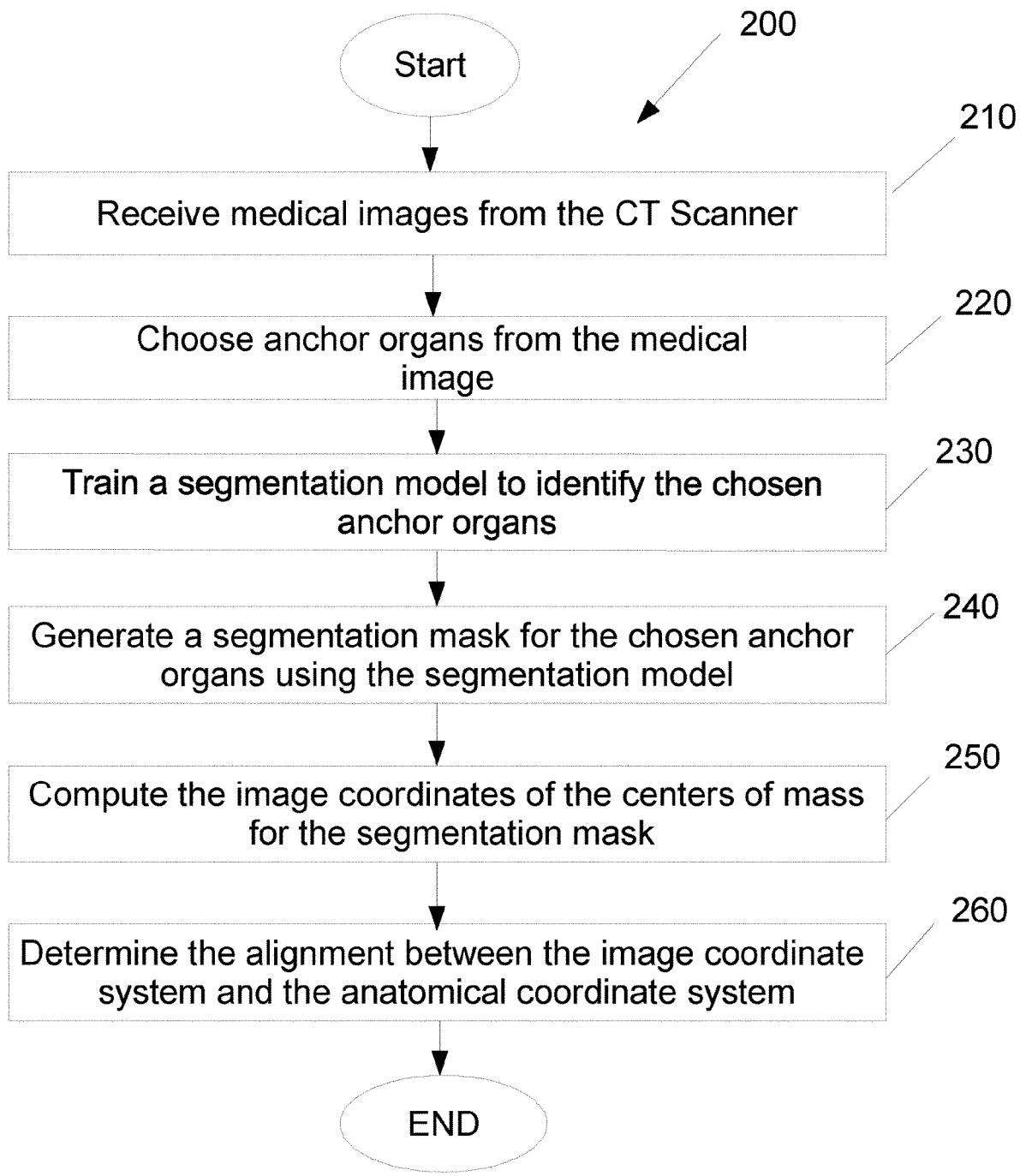
FIG. 2 shows a flow diagram of a method for generating an orientation according to various exemplary embodiments of the present disclosure.

FIG. 2 shows an exemplary method 200, in which the system 100 determines a body orientation in a 3D scan and conforms the image to a standard or custom anatomical coordinate system. The method 200 includes receiving medical images from the CT scanner in 210. In 220, the method further includes selecting a number of anchor organs as illustrated in FIG. 3 from the 3D scans received in 210 to ultimately align the plurality of 3D scans. In the exemplary embodiments as shown in FIG. 3, the liver, spleen, right kidney and left kidney are selected from the 3D scan as the anchor organs for the patient. The organs are selected in the 3D scan based on the organs available in the training dataset in the database 110.

A segmentation model is trained in 230 to identify the anchor organs in each 3D scan applied to the segmentation model. The segmentation model is stored in the memory 110 and applied to every new 3D scan obtained from the CT scanner 102. As illustrated in FIG. 4, the segmentation model identifies the anchor organ in the 3D scan, the shape of the anchor organ in the 3D scan, and which 3D scan voxels belong to the anchor organ or the background. The segmentation model is trained to segment the 3D scan by giving each voxel of the image a label, generating a 3D segmentation mask. Different training datasets may be used for the image segmentation. The training datasets for training the segmentation model usually include images, their corresponding labels and a voxel-wise mask. The segmentation masks are labels for each voxel of the image. Each voxel of the mask is given at least one of two categories: class 1 belonging to the anchor organ and class 2 belonging to the surrounding of the anchor organ or not belonging to the anchor organ. The voxel belonging to the anchor organs may be represented with different colors in the segmentation mask whereas the background may be left as black. In the exemplary embodiment, the liver, spleen, right kidney and left kidney are represented with different colors as illustrated in FIG. 4, whereas the background is represented with the color black.

In 240, the segmentation model generates the segmentation mask for the anchor organs identified in 230. The segmentation model consumes the 3D scan with the selected anchor organs and produces a 3D segmentation mask for each 3D scan. As previously stated, the scans may have arbitrary orientation.

Thus, in 250, the image coordinates of the centers of mass of the anchor organs are determined using the 3D segmentation mask generated in 240. The centers of mass for each anchor organ may be determined by initially determining their positioning in an image coordinate system and their respective masses. The masses are multiplied with their respective positions, summed up and divided by the sum of their total masses to obtain the points of the image coordinate of the center of mass for each anchor organ. The points for each anchor organ obtained are denoted by $C_{organ1} \ldots C_{organN}$ In the exemplary embodiments, the image coordinates for the centres of mass of the liver, spleen, right kidney and left kidney are computed for each 3D scan as indicated in FIG. 5. The centers of mass are represented with circles, although the circles are only exemplary and thus other forms of indicating the centers of mass may be employed.

In 260, the alignment between the computed anchor organs positions in the 3D scan and the organ positions in the training dataset from the database 110 are determined. The alignment between the two different coordinate systems are determined based on a coordinate system transition computation. The anchor organs are presented in an image coordinate system. The organ positions from the training dataset may be presented in an anatomical coordinate system, although the anatomical coordinate system is only exemplary. The method 100 utilizes a decision function to consume the position of the organs in the training dataset and approximately match the positions with the computed anchor organ positions in the 3D scan. The decision functions that may be utilized include a flipping case, a shift case and a rotation case. It will be understood by one of ordinary skill in the art that these cases are only exemplary and thus, other decision functions may be applied. The three cases that may be implemented are further described below.

In the flipping case, the transition may be implemented by flipping several axes of the image coordinates computed for the centers of mass of the anchor organs. Alternatively, a shift of the coordinate system may be implemented for the shift case and a transition may rotate the coordinate system on arbitrary angles for the shift case.

Implementing the flipping case includes taking into account rules of knowing the positions of the organs in the human body with respect to each other. For instance, rules such as, the heart is always above the liver or the left lung is on the left and the right lung is on the right, etc. are known in the art. Thus, by implementing such rules, the method 200 is able to determine whether an inversion of the image coordinate axis of the anchor organ is required to align with the anatomical coordinate axis of the properly oriented training datasets in the database 110. For example, if the Z coordinate of the image coordinate axis represents the superior-inferior axis, then the sign of the projection of the centers of difference on the superior-inferior axis sign $((C_{heart} - C_{liver}) \cdot [0; 0; 1])$ tells whether the axis flipped. If the sign is a minus, then the image axis is flipped. It will be understood by one of ordinary skill in the art that the positions of the centers of the organ will determine how the axis will be flipped.

As previously mentioned, the decision function for the coordinate system transition computation may also be a shift case. In the exemplary embodiment, the shift case can be handled by determining the average of the points of the anchor organs determined in 250. As indicated, $$\frac{C_{organ1} + \cdots + C_{organN}}{N}$$

the points of the centers of mass for each anchor organ are summed up and divided by the total number of anchor organs. Although the points of the centers of mass are obtained from the 3D scan, the determined average point depends on the body properties and the organ positions in the 3D scan. Thus, the average point can be robustly used as an origin for any further position-dependent analysis.

Alternatively, the rotation case may be implemented as the decision function in 260 in the exemplary embodiment. In this exemplary embodiment, the task at hand would determine the number of points needed to find the transformation. In a general rotation case, at least three anchor organs are required because it is sufficient to have at least three noncollinear points to describe the position of a rigid body. It will be understood by one of ordinary skill in the art that the number of anchor organs for the rotation case is only exemplary; thus more than three anchor organs may be used. Implementing the rotation case requires actual organ coordinates to be computed in 250 and target coordinates. The target coordinates may be computed in advance by averaging the organ coordinates on the properly oriented images from the training dataset in the database 110.

Thus, if the coordinates of the anchor organ computed in 250 are presented in an anatomical coordinate system, then the actual organ coordinates (coordinates of the anchor organs) and the target coordinates may be used to compute the 3D rotation matrix. Additionally, the 3D image may be transformed using the actual organ coordinates and the target coordinates. It will be understood by one of ordinary skill in the art that, the anatomical coordinate system is only exemplary and thus, other coordinate systems of interest may be used to present the points.

Transforming the points with the rotation case requires a pivot for the rotation. Accordingly, the centroid of the set $C_{organ1} \ldots C_{organN}$ computed in 240 may be selected as the pivot for the rotation. Then, the vectors in the target coordinates and the organ coordinates become relative to the centroid and normalized to the unit length. An exact rotation matrix for transforming the anchor organs to the target organs usually does not exist. Thus, an algorithm such as Kabsch algorithm may be used to find an approximation for transforming the anchor organs to the target organs. It will be understood by one of ordinary skill in the art that using the Kabsch algorithm is only exemplary, and thus other algorithms may be used to approximate the rotation matrix.

As illustrated in FIG. 6, the exemplary embodiment determines the coordinate system transition computation for the 3D scan in FIG. 3 using a decision function. In the exemplary embodiment, the rotation case is used to align the target coordinates and the anchor organ coordinates to generate an aligned 3D scan. Image 602 in the decision function represents the average body structure template that is computed on the training data set. The "Etalon organ positions" represents the target coordinates $\overline{C}_{organ1} \ldots \overline{C}_{organN}$ that is computed from properly oriented images from the training dataset. Thus, the orientation of the image from the training data will determine the position of the target coordinates. Image 604 shows the computed organ positions as described in 230-250.

It will be understood by one of ordinary skill in the art that the anchor organs selected in image 604 are dependent on the organs available in the image of the body structure from the training data. As indicated in FIG. 6, the computed organ position and the etalon organ positions are not aligned, and thus the decision function consumes the etalon organ position and approximately matches the etalon organ positions with the computed organ positions of the 3D scan. The matching is performed by computing the transformation required for conforming the image to the coordinate system of interest. The exemplary case depicted in FIG. 6 shows a 90° rotation indicating that the rotation case in 260 was implemented. It will be understood by one of ordinary skill in the art that other exemplary cases may be applied depending on the orientation of the 3D scan with respect to the target coordinates in the training dataset.

The exemplary embodiments described above may be used for data intensive research. For example, when training a learning model, the user needs to ensure that the images are oriented uniformly or that only some particular part of the body is present in the image. Also, the trained segmentation model may be used as a tool for external research such as a Health and Safety Institute (HIS) platform. The exemplary embodiments may be further used for apps for the end user. For example, the medical may employ the system to align the images they see with a particular coordinate system.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method, comprising:
receiving a set of medical images from a medical imager;
selecting one or more anchor organs from the medical images;
generating, based on applying a segmentation model to each of the set of medical images, a segmentation mask for the selected one or more anchor organs, wherein the segmentation model is trained to identify the selected one or more anchor organs in the set of medical images based on a training dataset received from a database;
computing image coordinates for the selected one or more anchor organs in each of the set of medical images based on a center of mass of each of the selected one or more anchor organs and the generated segmentation mask;
determining a correlation between the image coordinates for the selected one or more anchor organs in each of the set of medical images and corresponding anatomical coordinates for the selected one or more anchor organs in the training dataset; and
aligning each of the set of medical images based on the correlation between the image coordinates and the anatomical coordinates.

2. The method of claim 1, wherein the aligning is further based on a decision function comprising one of a flipping case, a shift case or a rotation case.

3. The method of claim 2, wherein the aligning is further based on a set of rules based on anatomical features of a person.

4. The method of claim 1, wherein the segmentation model is trained to consume the set of medical images in a low resolution.

5. The method of claim 1, wherein the segmentation model is trained to be scale and rotation invariant based on the training dataset being augmented with random scaling and rotations.

6. The method of claim 1, wherein the segmentation model is trained to segment each of the set of medical images by giving each voxel of each medical image a label, wherein the label comprises one of a voxel belonging to the selected one or more anchor organs, a voxel belonging to a surrounding of the selected one or more anchor organs or a voxel not belonging to the selected one or more anchor organs.

7. A system, comprising:
a memory storing a set of medical images received from a medical imager and a training dataset;
a processor configured to:
select one or more anchor organs from the set of medical images,
generate, based on application of a segmentation model to each of the set of medical images, a segmentation mask for the selected one or more anchor organs, wherein the segmentation model is trained to identify the selected one or more anchor organs in the set of medical images based on a training dataset received from a database,
compute image coordinates for the selected one or more anchor organs in each of the set of medical images based on a center of mass of each of the selected one or more anchor organs and the generated segmentation mask,
determine a correlation between the image coordinates for the selected one or more anchor organs in each of the set of medical images and corresponding anatomical coordinates for the selected one or more anchor organs in the training dataset, and
align each of the set of medical images based on the correlation between the image coordinates and the anatomical coordinates.

8. The system of claim 7, wherein the aligning is further based on a decision function comprising one of a flipping case, a shift case or a rotation case.

9. The system of claim 7, wherein the segmentation model is trained to consume the set of medical images in a low resolution.

10. The system of claim 7, wherein the segmentation model is trained to be scale and rotation invariant based on the training dataset being augmented with random scaling and rotations.

11. The system of claim 7, wherein the segmentation model is trained to segment each of the set of medical images by giving each voxel of each medical image a label, wherein the label comprises one of a voxel belonging to the selected one or more anchor organs, a voxel belonging to a surrounding of the selected one or more anchor organs or a voxel not belonging to the selected one or more anchor organs.

12. A non-transitory computer readable storage medium comprising a set of instructions which, when executed by a processor, cause the processor to:
receive a set of medical images from a medical imager;
select one or more anchor organs from the medical images;
generate, based on application of a segmentation model to each of the set of medical images, a segmentation mask for the selected one or more anchor organs, wherein the segmentation model is trained to identify the selected one or more anchor organs in the set of medical images based on a training dataset received from a database;
compute image coordinates for the selected one or more anchor organs in each of the set of medical images based on a center of mass of each of the selected one or more anchor organs and the generated segmentation mask;
determine a correlation between the image coordinates for the selected one or more anchor organs in each of the set of medical images and corresponding anatomical coordinates for the selected one or more anchor organs in the training dataset; and
align each of the set of medical images based on the correlation between the image coordinates and the anatomical coordinates.

13. The non-transitory computer readable storage medium of claim 12, wherein the aligning is further based on a decision function comprising one of a flipping case, a shift case or a rotation case.

14. The non-transitory computer readable storage medium of claim 12, wherein the segmentation model is trained to one of (i) consume the set of medical images in a low resolution, (ii) be scale and rotation invariant based on the training dataset being augmented with random scaling and rotations or (iii) segment each of the set of medical images by giving each voxel of each medical image a label.

* * * * *